United States Patent [19]
Griffin

[11] Patent Number: 5,597,601
[45] Date of Patent: Jan. 28, 1997

[54] COOKING OIL FILTERING APPARATUS AND PROCESS EMPLOYING CYLINDRICAL SINTERED METAL FILTERS

[75] Inventor: Jerry A. Griffin, Citrus Heights, Calif.

[73] Assignee: Purifry, LLC, Cordova, Calif.

[21] Appl. No.: 608,643

[22] Filed: Feb. 29, 1996

[51] Int. Cl.⁶ .............................. B01D 17/12; A47J 37/12
[52] U.S. Cl. .............................. 426/417; 99/403; 99/408; 210/791; 210/805; 210/90; 210/241; 210/167; 210/175; 210/196; 210/248; 210/496; 210/497.01; 210/510.1; 210/DIG. 8
[58] Field of Search ..................... 426/417, 438; 99/403, 408; 210/DIG. 8, 791, 805, 90, 241, 167, 175, 196, 248, 496, 497.01, 510.1

[56] References Cited

U.S. PATENT DOCUMENTS

| | | |
|---|---|---|
| 2,826,805 | 3/1958 | Probst et al. . |
| 2,877,903 | 3/1959 | Veres . |
| 2,968,405 | 1/1961 | Veres . |
| 2,979,400 | 4/1961 | Mouwen . |
| 3,241,681 | 3/1966 | Pall . |
| 3,685,433 | 8/1972 | Cunningham . |
| 3,937,136 | 2/1976 | Cox . |
| 3,968,741 | 7/1976 | Hunt . |
| 4,186,100 | 1/1980 | Mott . |
| 5,160,444 | 11/1992 | McFarland . |
| 5,184,539 | 2/1993 | Oiwa . |

*Primary Examiner*—Robert J. Popovics

[57] ABSTRACT

Improved apparatus and process for filtering cooking oil of the type used in deep fat fryers such as are used in restaurants and bakeries. Full cooking temperature oil from the fryer vat is forcefully moved by a motorized pump through a canister holding a sintered metal filter which is preferably made of fused Stainless steel granules and which will filter-out solid particles down to about 0.5 microns in dimension from the oil. The hot oil passes through the filter before the filtered hot oil is returned to the fryer vat through a hand held flexible dispensing hose. The canister includes an openable lid to allow repeated removal, washing and re-installation of the highly durable and reuseable sintered stainless steel filter. One preferred embodiment in accordance with the invention is a portable unit mounted on wheels so it can be rolled from one fryer to another fryer and then to an out of the way storage area.

14 Claims, 9 Drawing Sheets

COOKING OIL FILTERING APPARATUS AND PROCESS EMPLOYING CYLINDRICAL SINTERED METAL FILTERS

BACKGROUND OF THE INVENTION

1. Field of the Invention

The present invention relates to improvements in the on-site filtering of cooking oil of the type held in vats of deep fat fryers used in cooking establishments such as in restaurants, donut making and bakery operations and the like. The filtering of the edible cooking oil is intended to remove small solid particles from the oil to extend its useful life for economic and environmental reasons.

2. Description of the Prior Art

It is known that the edible cooking oil in a deep fat fryer vat accumulates solid impurities from the foods cooked therein, the solid impurities charring (carbonizing) and continually breaking into smaller particles with heat and time, and leading to food cooked in the oil not tasting and smelling as good as it otherwise could have had the oil been clean, as described in U.S. Pat. No. 5,160,444 issued Nov. 3, 1992 to G. E. McFarland for Cooking Oil Filtering Method and Apparatus. The McFarland patent 5,160,444 is currently assigned to the same Assignee of the present invention, and is herein incorporated by reference for both essential and non-essential information. The McFarland patent is incorporated primarily but not exclusively for its descriptions of filter containing canisters, conduits feeding cooking oil to the canisters and filtered oil away from the canisters; canister and filter shapes, and seals to ensure the impurity laden oil passes through the filter element; oil filters removably contained within the canisters; the openable lids on the canisters which allow removal of the filters; the fluid tight nature of the canister lids in the closed condition; the use of a pressure gauge to sense when the filter is creating excessive back pressure; the use of a motorized fluid pump to forcefully move the cooking oil through conduits, filters and back into the fryer vat; and for the mounting of the filtering apparatus on wheels. The present invention seeks to overcome major shortcomings in the McFarland invention and other related prior art cooking oil filtration systems.

It is not uncommon in a busy restaurant or donut making operation for the deep fat fryer cooking oil to become contaminated with solid impurities in a single day beyond that which allows the oil to be properly used the following day unless the oil is effectively cleaned such as by filtering to remove at least some of the impurities. Prior art cooking oil filtering processes and apparatuses have been developed for on-site cleaning of the oil in a deep fat fryer vat in an attempt to extend the useful life of the cooking oil, although none are the same or as effective as the present invention at addressing the problems associated with deep fat fryer oil. Most if not all of the prior art cooking oil on-site cleaning arrangements employ the use of disposable filters of cloth, paper, wound cotton string, diatomaceous earth, and sometimes large mesh wire screens used as large chunk pre-filters or screens in combinations with finer disposable filtering materials such as paper, wound cotton string and the like. In most all oil filtering using these prior art filters, the cooking oil is moved through the filter in a warm state so that the oil is liquified, or not congealed. The disposable oil filters of the prior art have very short useful lives, as they clog with the impurities removed from the oil, and are not sufficiently durable to allow proper cleaning for re-use, although some woven cloth filters may be washed and reused a couple of times. Additionally, prior art cooking oil filtering arrangements often only extend the life of the oil for between four and seven days, after which the oil is sent to an oil reclamation facility at the expense of the cooking facility operator. With the McFarland device using three wound cotton string filters connected in series and with daily filtering, the life of the oil can be greatly extended, however the larger porosity disposable filters for filtering down to 5 and 1 micron require replacement every couple of days depending upon the condition of the oil, and the 0.5 micron filter used by McFarland requires replacement after only a few minutes of filtering dependant upon the condition of the cooking oil being filtered. If the McFarland 0.5 filter is not changed when it becomes clogged with entrained solid impurities, the pressure required to push the oil through the very fine filter will cause the string of the filter to part or separate wherein the oil will pass through the filter without any further filtering. This filter parting to allow oil to pass without any further filtering also occurs with the 5 and 1 micron filters used in the McFarland apparatus if these filters are not changed after collecting of a significant amount of solid particles. Another significant drawback found in the McFarland device was that the wound cotton string began to char at about 200 degrees fahrenheit, which is well below the operating temperature of fat fryer cooking oil. Wound cotton string filters require replacement at what is considered to be an excessive frequency, are not suitably structured to allow cleaning and reuse and thus are disposable, and begin charring at a relatively low temperature.

Furthermore, in many if not all states of the U.S., cooking oil and disposable equipment containing significant amounts of the cooking oil, such as disposable oil filters for example, must be handled similar to hazardous waste. Such special handling of oil and contaminated filters costs a significant amount of money, and thus, between the cost of emptying and then refilling the fryer vat with new clean oil every few days, and the special handling requirements associated with discarding of the impurity laden oil and disposable filters, the maintenance of good clean cooking oil in the deep fat fryers in a restaurant or like large scale cooking operation is currently quite substantial.

Additionally, since many large scale kitchen operators are not aware that they are not supposed to, or that it is environmentally unsound to dispose of disposable cooking oil filters simply by throwing them into the garbage to be hauled to the local landfill, many disposable filters saturated with cooking oil end up in the landfill leaching oil into the ground, ground water and streams.

With filtering cooking oil utilizing prior art filtering arrangements, particularly those utilizing single stage disposable filters, the useful life of the oil is not significantly extended, as many filtering systems currently on the market advertise that they can extend the useful life the oil for four to seven days with daily filtering. This relatively short extension of the useful life of the oil is in most cases due to the relatively large porosity of the disposal filters, and the delicate nature of such filters which limits the fluid pressure or suction which may be applied to move the oil through the filter without the filter collapsing, tearing or otherwise coming apart and opening up to allow unfiltered oil to pass. This delicate nature of the prior art disposable filters generally requires a relatively large porosity, particularly when used in a single stage filtration, since high pressure cannot be applied, at least not for an extended period, to push the oil through the filter, thus often times commonly disposable filters are designed to filter out solid particles down to only about 30 to 50 microns, and usually if not always with the cooking oil substantially below cooking temperature to avoid filter charring.

Numerous different types of edible king oils are employed in deep fat fryers as determined by factors including cost of the oil, saturated fat and other health and nutrition concerns, taste of the oil, and desired operating temperature for particular types and classes of foods to be cooked in the oil. These different types of oils which include animal fat, palm oil, peanut oil, safflower oil, canola oil and combinations thereof to name just a few, all have varying burn temperatures and thus maximum operating temperatures. Depending upon the oil used in a deep fat fryer vat, and the wishes of the chef, deep fat fryers are operated at varying temperatures ranging anywhere between 325 to 400 degrees fahrenheit. Disposable filtering materials such as some of the paper and cloth-like materials such as the wound cotton style filters will char at the normal oil operating temperatures which can by itself add an undesirable taste and color to the oil during filtering with such filters. In order to avoid such filter charring, the oil must be filtered prior to the oil reaching operating temperature, or it must be allowed to cool substantially before filtering, which is oftentimes inconvenient since the oil will not cool down rapidly simply by dissipating heat into the ambient air around the vat, which is the normal process of cooling the hot oil. An additional possible inconvenience, depending upon the particular situation, is that during the cooling of the cooking oil, the fryer is out of service, and this might be particularly undesirable in a restaurant which is open 24 hours a day and which only has one or two fat fryers. It would be advantageous to be able to rapidly filter the cooking oil at full cooking temperature.

Deep fat fryer cooking oil is a significant re-occurring cost in the operation of a restaurant, large scale kitchen, donut shop bakery or the like. Likewise disposable cooking oil filters if employed to clean the oil in an attempt to reduce the re-occurring cost of cooking oil themselves represent a re-occurring cost since they are disposable and must be re-purchased, stocked, and discarded under special and relatively expensive handling procedures after one to several filterings. Thus, there still exists significant need for improvements in the field of on-site filtering and extending of the useful life of cooking oil in deep fat fryers for reasons pertaining to economics and the environment.

Additional prior art information pertaining to deep fat fryer oil filtering which may be of interest to the reader can be found in U.S. Pat. No. 3,685,433 issued Aug. 22, 1972 to C. R. Cunningham describing the use of a paper filter for filtering cooking oil; U.S. Pat. No. 5,184,539 issued Feb. 9, 1993 to M. Oiwa describing use of a metal gauze and a ceramic filter for filtering the cooking oil; U.S. Pat. No. 3,968,741 issued Jul. 13, 1976 to A. J. Hunt describing the use of fine paper or cloth filters connected in series to filter cooking oil; and U.S. Pat. No. 3,937,136 issued Feb. 10, 1976 to E. D. Cox describing the use of metal screens for filtering cooking oil.

Prior art information pertaining to metal filters and particularly sinter or diffusion bonded filters can be found in U.S. Pat. No. 2,877,903 issued Mar. 17, 1959 to E. Veres describing use of a cylindrical sintered metal filter for a sump pump; U.S. Pat. No. 2,826,805 issued Mar. 18, 1958 to R. L. Probst et al describing the making of filters from sintered stainless steel particles; U.S. Pat. No. 4,186,100 issued Jan. 29, 1980 to L. H. Mott describing the making of filters from metal particles in a sintering operation; U.S. Pat. No. 3,241,681 issued Mar. 22, 1966 to D. B. Pall describing the making of filters from sintered metal particles; U.S. Pat. No. 2,968,405 issued Jan. 17, 1961 to E. W. Veres describing a sintered metal filter and method of making; and U.S. Pat. No. 2,979,400 Apr. 11, 1961 to H. C. Mouwen describing the making of filter material in a sintering operation. Although none of these patents pertaining to sintered or sinter formed metal filters anticipate the use of sintered stainless steel filters for filtering edible cooking oil of a fat fryer as in the present invention to achieve all of the many significant advantages thereof, they provide details pertaining to the general type of filter element utilized as part of the present invention, and how such filters can be manufactured out of various metals in various shapes and sizes, and in varying porosities for filtering out various sized solid particles from fluids, and with varying sizes and shapes of granular metal particles to be fused to one another in a sintering operation, sometimes referred to as diffusion bonded or bonding, and for this information, U.S. Pat. No. 2,877,903; U.S. Pat. No. 2,826,805; U.S. Pat. No. 4,186,100; U.S. Pat. No. 3,241,681; U.S. Pat. No. 2,968,405; and U.S. Pat. No. 2,979,400 are herein incorporated by reference.

SUMMARY OF THE INVENTION

The following detailed description is of best modes and preferred structures for carrying out the invention, and while reading this disclosure, those skilled in the art will realize some changes can be made to that which is specifically herein described and shown in the included drawings without departing from the true scope of the invention.

Disclosed are processes and apparatuses for the on-site filtering of cooking oil of the type used in deep fat fryers such as are used in restaurants, donut making and bakery operations, large scale kitchens and the like, henceforth large cooking operation(s). "On-site" is herein to mean at the location of the deep fat fryer within the large cooking operation, with on-site filtering being preferred so as to reduce handling and transportation costs of oil and machines. With the present invention, the impurity laden cooking oil, which is preferably heated in a deep fat fryer vat to operational or nearly operational cooking temperature in order to liquify as many fat solids as possible, is pushed under pressure or drawn with suction (forcefully moved) by a motorized fluid pump through a renewable sintered metal filter made primarily of fuse metal stainless steel granules fused to one another in a prior sintering operation, which will filter-out solid particles from the oil. The porosity of the renewable sintered metal filter preferably removes particles from the oil down to about 5 microns or smaller in size, but this can be varied within the scope of the invention as will be discussed. For the purposes of this disclosure the term "renewable" used in reference to the cooking oil filter is meant to define a filter which can be used to filter out solids from the cooking oil down to a very small size, and one which can be washed by hand, by machine or possibly back-flushed to remove the collected solids and to restore (renew) the filter back to its original or nearly original filtering capabilities a great many times, such as 100 or more times for example. The term renewable filter is not meant to mean a course wire or punched metal plate pre-screen as sometimes used in the field to initially remove only large chunks of food down to only about 3/64 of an inch in dimension, prior to the oil being passed through a fine filter. Preferably, but not essentially, the renewable filter is one which can be readily removed from the apparatus in which the filter is normally contained, and then be hand or machine washed, and then be reinstalled into the apparatus for further filtering of cooking oil. The term "machine wash" could be to wash the filter in a dishwasher for example.

The use of a renewable sintered metal filter in the present invention, particularly one made of stainless steel and capable to filtering out particles down to a very small size, such as in a range of 0.5 to 50 microns, is a significant improvement in the field of on-site cooking oil filtering, and thus from one vantage point, the present invention can be looked upon as a substantially improved process and apparatus for on-site filtering of cooking oil. During testing utilizing sintered stainless steel filters for filtering hot cooking oil, it was found that the use of such filters provides many significant advantages in on-site deep fat fryer cooking oil filtering. These advantages include the filter being strong and durable, i.e., rigid, tear and shatter resistant to such as degree it may be cleaned with water or cleaning agents (water and soap or solvents) by hand or in a dishwasher, and be reused repeatedly. A sintered metal filter is not subject to shattering or other significant damage if dropped during cleaning, unlike ceramic filters which can easily shatter like glass if dropped or bumped. Additionally, a sintered stainless steel filter has been found to clean cooking oil extremely well even after extended use and with periodic cleanings, extending the life of the oil often times up to 30 or more days due to the fineness of the filter and the higher operating pressures the filter can withstand without collapsing (deforming), tearing or opening up due to the physical strength of such filters, resulting in the rapid filtering of substantially small particles under relatively high fluid pressure. The ability to operate the sintered filter in a relatively high pressure or vacuum environment allows for the filter to be structured to filter out very fine solid particles so as to virtually polish the oil. Even when the sintered stainless steel filter becomes significantly clogged due to having collected a large amount of solid impurities, the filter will not open up due to its strength and rigidity, as with more delicate filter material such as wound cotton string or paper filters for example. The use of relatively high pressure as allowed by the physical strength and stability of the sintered filter allows for all of the oil of a deep fat fryer vat to be moved through the filter quite quickly, and this is an advantage if the filter is built into a portable oil cleaning apparatus intended to be rolled on wheels from one fryer to the next in a large cooking operation during or at the end of a day. Sintered filters, particularly when mainly comprised of stainless steel, are very stable chemically, being corrosion resistant, and inert to cooking oil so as to not taint the cooking oil. Such filters are also thermally stable usually up to around 1000 degrees fahrenheit, and thus being able to filter the hottest of cooking oil without any charring or warping. A sintered metal filter as used in the present invention will last for years if not indefinitely, and thus it is not necessary to dispose of the filter periodically under expensive special handling processes. Additionally, since the filter is readily washable and reusable, replacement filters need not be purchased and stored on-site, and this aspect alone can produce a significant savings for an operator of a large cooking operation. The use of a sintered metal filter in filtering fat fryer oil will significantly extend the life of the oil, will eliminate or greatly reduce the amount of oil shipped to an oil reclamation facility, will eliminate the repeated purchase and disposal of disposable filters under special and expensive handling processes, and will eliminate the risk of the restaurant operator running out of disposable filter and thus being caught without the ability to filter the oil during or at the end of the day, typically requiring the early disposal of the oil and the replenishment of the fryer vat with new oil. A sintered stainless steel filter will eliminate the possibility of filter charring if excessively hot oil is pushed through the filter, and this will not only allow full cooking temperature oil to be filtered, but will lessen the skill requirements of the operator, eliminating the operator from having to remember not to pass excessively hot oil through the filter, and eliminating the need to allow excessively hot oil the time to cool down prior to being filtered. All of these advantages gained by utilizing a sintered stainless steel filter will very dramatically reduce the reoccurring costs associated with deep fat fryer cooking oil in a large cooking operation.

A suitable process in accordance with the invention in which to remove at least some of the larger solid impurities from used cooking oil is to drain all of the hot oil from the deep fat fryer through the bottom drain of the fryer into an auxiliary reservoir sized to hold all of the hot oil of the fryer vat. The hot oil can be 300 degrees fahrenheit or at full cooking temperature which is even hotter normally. The impurity laden hot oil is then pumped or drawn through the sintered stainless steel filter in a circulatory system and directed back into the fryer vat such as through a hand-held flexible hose. With the fryer vat drain pipe and valve in the open position to continue to drain oil from the vat into the auxiliary reservoir, the clean oil from the output side of the filter is directed through the hand-held hose to the sides and bottom of the vat as a rinse, and scrapping or like abrasive action with a cleaning tool may be performed to remove as much of the solidified matter in the vat as is possible. The clean hot oil directed back into the vat while the fryer vat drain is open serves as a rinsing and cleaning fluid to help clean the fryer vat. Once the vat is scrapped and rinsed clean, all of the impurity laden oil is allowed to leave the vat, being flushed with the input of clean oil into the auxiliary reservoir. The fryer vat drain is then closed, and the fryer vat refilled with clean oil from the auxiliary reservoir having been moved through the sintered stainless steel filter and flexible hand-held dispensing hose. Additional clean or new oil may be added to the fryer vat to bring it to the full level to compensate for oil lost in prior cooking. With this process at the completion of the filtering of the oil and refilling of the fryer vat, the solid particles filtered out by the sintered filter are separated from the now clean oil in the fryer vat, and this allows removal of the filter for cleaning while the fryer is put back into use, and prevents the filtered out contaminates from remaining in contact with the clean filtered oil which would re-contaminate the cooking oil.

Generally, the fryer oil should be filtered once a day or every 8 to 12 or so hours of use, and the sintered filter cleaned once a week or whenever an indication of excessive back pressure exists, however these time frames will vary depending upon many factors. The frequency of the required cleaning of the filter will be determined by many factors, however, generally speaking the larger surface area of the filter, the less frequent cleaning will be required. One simple process in which to achieve large filter surface area in order to reduce the required frequency of filter cleanings is to use two or more filters which are preferably connected in parallel in the fluid system, as will be described in reference to at least one structural embodiment in accordance with the present invention. Since filter cleaning is part of a maintenance program requiring time and labor, it is desirable to reduce that amount of required maintenance to a minimum, and so the preferred embodiments of the present invention are intended to be able to provide daily filterings of a single approximately 7.5 gallon fryer vat for about one week before the filter(s) needs to be removed from the apparatus and cleaned.

In a preferred embodiment of the present invention, the sintered filter, a motorized fluid circulation pump and auxiliary reservoir, and additional support conduits and equipment are all mounted as a unit on wheels to roll on a floor surface, as this portable unit allows the operator or owner of a large cooking operation which may have several or even many deep fat fryers to acquire and use just one of this preferred embodiment of the invention, since this portable filtering apparatus can be rolled from one fryer to the next, eliminating duplication of filtering equipment, and thus providing the advantage of economic savings in the initial purchase and in maintenance by utilizing this portable unit for filtering the fryer oil of many on-site deep fat fryers.

Although stainless steel granules fused in a sintering operation have been suggested and are preferred from which to structure the sintered filter utilized as part of the present invention, it is possible other metals preferably inert to cooking oil possibly such a gold in granular form can be utilized to form a suitable sintered filter, however, stainless steel is approved by the Food and Drug Administration (FDA) among other testing and approving agencies dealing with food handling equipment, as most recognize stainless steel as being suitable for direct contact with food.

Additionally, although the herein incorporated McFarland patent describes a three stage filtering arrangement wherein three successively finer wound cotton filters are connected in series, the description of the present invention is primarily of a single stage filtration using a sintered filter, and this is not to place the use of multiple filters connected in series outside of the scope of the present invention, as the present invention preferably includes a large chunk and particle prescreen, which from one vantage point is filtering in series.

It should be understood that it is preferable to filter solid particles from the cooking oil at least down to approximately 5 microns in dimension (or smaller) utilizing a sintered metal filter, but that utilizing a sintered filter to remove solid particles from the cooking oil only down to about 30 to 50 microns in dimension, a range common with many disposable filters, would still be an improvement in the art and within the scope of the invention since the useful life of the oil would be extended, and the sintered metal filter could be washed and reused repeatedly as opposed to having to be disposed of, and this would be useful and beneficial, although filtering the solid particles from the oil down to about 5 microns (or smaller) is clearly preferable for greatly extending the useful on-site life of the cooking oil.

Additionally, the present invention anticipates utilizing a sintered metal filter having the proper porosity to filter solids from cooking oil down to 0.5 micron in dimension using a high pressure pump to move the cooking oil through the filter. Such fine filtering of the cooking oil may render it needless to ever dispose of any of the oil of the fryer. One reason as to why the oil may be used indefinitely with daily filtering of the oil to 0.5 microns is because often about 10% of the oil of a frequently used fryer is lost per day by adhering to food cooked in the fryer. This 10% loss is replenished daily with new oil, and this factor coupled with daily filterings of the cooking oil through a sintered filter having a porosity to remove solid particles down to about 0.5 microns may eliminate ever sending the cooking oil to a reclamation facility.

Therefore, it is a primary object of the invention to provide an improved filtering process and apparatus for the on-site filtering of deep fat fryer oil, wherein the filter of the apparatus is reuseable for a greatly extended time, and one which is easily cleaned to be restored to its original filtering capabilities, but does not need to be too often. A further object is to provide such a process and apparatus which uses a filter which is extremely durable, being generally nonbreakable if dropped such as during cleaning, and even further wherein the filter is chemically inert relative to the cooking oil and will remove solid impurities down to a range of 0.5 to 50 microns, and rapidly under a relatively high operating fluid pressure, and with the oil at full cooking temperature so as to thoroughly and relatively quickly clean the oil to significantly extend the useful life of the oil. A further object is to provide a filtering apparatus which will allow the rapid and convenient filtering of the cooking oil of a fryer vat at any convenient time even when the oil as at full cooking oil, thereby allowing the oil to be filtered in just a few minutes such as during a brief slow-down in a 24 hour restaurant setting where it is important to keep the fryer operating as much as is possible.

These, as well as other objects and advantages will become more fully appreciated with continued reading and with a review of the attached drawings and claims.

BEST MODES FOR CARRYING OUT THE INVENTION

Figure 1:
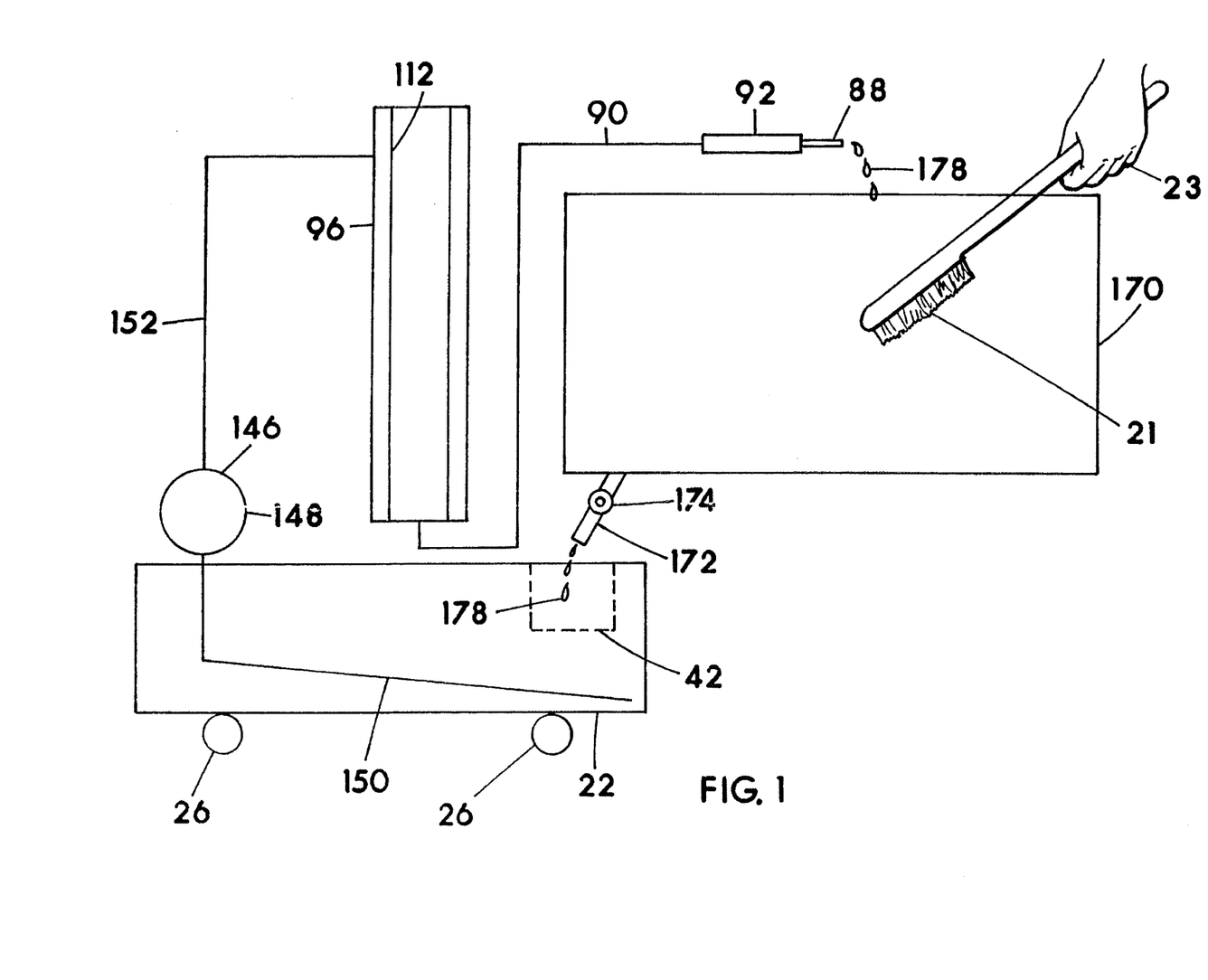
FIG. 1 is a schematic depiction of a cooking oil cleaning flow circuit and apparatus in accordance with the present invention.

With reference now to the drawings in general and particularly to FIGS. 1–7, and with keeping in mind the information herein incorporated by reference for a detailed description of a preferred process and embodiment of a cooking oil cleaning apparatus and individual components thereof, in accordance with the present invention given for example and not meant to unreasonably restrict the true scope of the invention. Like components in the FIG. 1 schematic depiction, and the first and second embodiments 20, 190 will have like reference numbers. Shown in FIG. 1 is a schematic depiction of a cooking oil filtering flow circuit and apparatus in accordance with the present invention for on-site filtering of cooking oil of a deep fat fryer vat 170 utilizing an auxiliary reservoir tank 22 sized to receive and hold all of the cooking oil 178 of the fryer vat 170, so that all of the oil can be drained from the fryer vat 170 into the reservoir 22 and the vat 170 cleaned and rinsed, such as manually scrapped with a brush 21 or like cleaning tool by hand 23 and the sides and bottom of the vat 170 rinsed with filtered hot cooking oil while drain and valve 172, 174 are still open. The cooking oil is transferred from fryer vat 170 through drain pipe 172 of the vat 170, the gravity flow of oil through drain pipe 172 being controllable by manually controlled valve 174 attached to pipe 172. Preferably the impurity laden oil drained from vat 170 into reservoir 22 passes first through a large chunk removing pre-screen 42 removably mounted in a receiving opening in reservoir 22. The openings in pre-screen 42 should be large enough to allow the oil to flow freely and rapidly with gravity through the screen into reservoir 22, and leaving the larger (about 100 micron and larger) solid particles in screen 42. Shown is a motor 146 driven fluid pump 148 connected to first conduit 150 connecting between an input side (suction side) of pump 148 and an open end of the conduit 150 positioned in the interior of reservoir tank 22 for allowing pump 148 to move (draw in this example) cooking oil within reservoir 22 through pump 148 and push the oil under pressure into second conduit 152 connected to an output (pressure) side of pump 148 for directing cooking oil under pressure into a canister 96 structured to direct all cooking oil received from the second conduit 152 through renewable filter element 112 contained within canister 96. Filter 112 is comprised substantially of sintered stainless steel granules (fused together in a prior sintering operation) chemically inert relative to the cooking oil and defining filter element 112 with a porosity sufficiently small as to filter solid particles out of the cooking oil down to about 0.5 microns in dimension. The filter 112 would be of value if it has a porosity to only filter solid particles out of the oil down to about 50 microns as previously addressed. The canister 96 and filter 112 are cooperatively shaped relative to one another, in combination with appropriately located fluid seals to ensure that any oil leaving canister 96 in a conduit 90 in the instant example, conduit 136 and then conduit 90 in embodiment 20, headed back to the fryer vat 170 must pass through the filter 112. Shown is a third conduit 90 in this example, connected to canister 96 and positioned for receiving filtered cooking oil from an output side of filter 112. In this example, filter 112 is a hollow cylindrical filter having a smaller exterior diameter than the interior diameter of canister 96 in which the filter 112 resides wherein impurity laden oil introduced into canister 96 first engages the exterior surface of the filter 112, and the oil which is under pressure from pump 148 passes through the filter 112 (or wall of the filter), and the solid particles in the oil are trapped in the filter and only filtered oil enters the hollow interior of the filter 112 to exit the filter 112 and canister 96 through third conduit 90. Third conduit 90 is shown including a hand holdable flexible dispensing hose for directing filtered cooking oil back into the fryer vat 170. Third conduit 90 (flexible dispensing hose) is shown including a thermally protective handle 92 for maintaining an area sufficiently cool for grasping by hand when hot cooking oil is being dispensed through hose 90. The thermally protective handle 92 can be a length of material such as a tube such as of plastic or metal, the handle tube being stood-off (separated) by mounting stand-offs between hose 90 and the interior of handle 92 wherein ambient air is allowed to pass and circulate between the mounting stand-offs, hose and interior surface of the handle tube to dissipate heat and maintain handle 92 relatively cool, as is commonly utilized in many commercial car wash establishments which use hand held wands to dispense hot cleaning liquids. Thermally protective handle 92 can be any suitable arrangement maintaining a graspable area on hose 90 sufficiently cool to grasp by hand even when 400 degree fahrenheit oil is moving through conduit 90. 88 is used in the drawing to generally designated the end of the hose 90 which is manually held when directly filter oil back into fryer vat 170, and is referred to as wand 88. Third conduit 90 can include rigid conduit such as 136 in embodiment 20 for at least some distance, such as adjacent canister 96, but transitions to flexible hosing 90 to allow manual directing of the filtered oil back into fryer vat 170. Being able to hold and manually direct the flow of filtered oil back into the fryer vat 170 is particularly useful during the cleaning (manual scrapping) and rinsing of the vat 170. A holding clip may be applied between the top edge of fryer vat 170 and wand 88 (holding clip not shown) to hold hose 90 and wand 88 in position for hands-free dispensing of filtered oil into fryer 170 if desired, and this holding clip might be particularly useful after the fryer 170 has been cleaned and the valve 174 closed to fill the vat 170 with filtered oil to complete the filtering operation. Valve 174 is manually closed for refilling vat 170 with filtered cooking oil in order to complete the filtering operation for putting the fryer 170 back into food cooking service. As can be appreciated from the previous descriptions, wheels 26 can be mounted to the bottom of reservoir 22, and motor 146 and pump 148, as well as canister 96, filter 112, and conduits 150, 152 and filtered oil exit conduit 136 and 90 can be mounted on reservoir 22 so as to be a portable unit able to be rolled on a floor from one fryer to another in a large cooking operation, and then rolled into an out of the way storage area since typically space within a commercial kitchen limited and thus valuable. Thus "portable" in reference to the wheeled apparatus in accordance with the present invention includes a weight not so great as to prohibit moving of the wheeled apparatus by a single person, for example under about 200 pounds.

A more detailed embodiment 20 is shown in FIGS. 2–7 for cleaning the edible cooking oil of a deep fat fryer vat 170. Embodiment 20 is an embodiment utilizing two canisters 90 and two sintered filters 112 in parallel in reference to unfiltered oil input to the canisters 96 and filters 112. The use of two filters 112 reducing the frequency of filter cleaning by providing greater filtering surface. Embodiment 20 includes an auxiliary reservoir 22, which is a tank located at the lower or bottom end of embodiment 20, and is sized to hold all of the cooking oil at once that a given fat fryer 170 vat holds, which is commonly about 7.5 gallons, although fryer vats are sold with smaller and larger capacities. Reservoir 22 is for receiving all of hot oil from a deep fat fryer 170, and to hold the oil for input (suction) line 150 of pump 148 to draw. Reservoir 22 will hold hot oil, and is preferably made of stainless steel. Reservoir 22 generally comprises a flat exterior bottom panel 24 which in this example cooking oil does not contact. Panel 24 is primarily for ease of manufacturing and for supporting the (wheels) casters 26 on a level plane. Four casters 26 are attached to bottom panel 24 to allow embodiment 20 to be stable and to easily move (portable) on a floor toward and away from a deep fat fryer 170. Reservoir 22 further includes a flat top panel 28 connected to the side 30 and end panels 32 (see FIG. 5) which defines the top of the reservoir 22 and supports housing 50 and other components such as motor 146, pump 148 and canisters 96. Reservoir 22 is further defined by two oppositely disposed side panels 30 connected to two oppositely disposed end panels 32, with the side and end panels 30, 32 connected in a fluid tight manner to interior sloped bottom panel 34 which defines a fluid support bottom within reservoir 22 to define a low point at cleaning drain 36 for draining and for allowing the open end of pipe 150 to draw from the low point in the reservoir 22. Drain opening 36 is positioned in the lowest point in reservoir 22, and is for allowing cleaning and rinsing (draining) of reservoir 22 when in the open condition. Drain opening 36 includes a removable plug or flow control valve (not shown) to seal and open. Drain opening 36 in the open condition opens reservoir 22 through bottom panel 24 and the exterior bottom of embodiment 20 to allow draining of all fluid therefrom, which might be cleaning soap, such as into a floor drain or container.

Shown in the drawings is extended front 38 of reservoir 22, which is low profile to be positionable under the bottom drain pipe 172 of deep fat fryer 170. Reservoir 22 is preferably narrow enough to fit between the two spaced apart front support legs 176 which are commonly employed to support and elevate deep fat fryer vats 170. Most if not all fat fryer vats 170 include a drain pipe 172 at the front of the fryer with a manual flow control valve 174 to allow opening of the pipe 172 to drain the cooking oil from the vat. A gravity flow system is used to drain oil from the fryer vat through drain pipe 172. Shown in the drawings is a crumb basket opening 40 in the top extended front 38 of reservoir 22 through which hot oil is received from drain pipe 172. A pre-screen or crumb basket screen 42 rests removably in opening 40 of reservoir 22 to catch large particles, crumbs and chunks of food as reservoir 22 is filled with impurity laden oil drained from deep fat fryer 170. The openings in screen 42 should not be too small or sintered filters 112 will clog or plug more rapidly, as it has been found that only very large chunks should be removed with screen 42, those chunks so large that if left in the oil might clog the pump 148 or one of the oil moving conduits 150, 152 or the like. The removal of solid particles down to a very small size utilizing screen 42 as a pre-screen can have a detrimental effect at the filtering stage by the sinter filters 112, as it has been found that if only very small solid particles such as 50 microns and smaller for example only are allowed to engage and be entrained on and by sintered filters 112 which themselves are structured to remove solid particles down to a very small size, the filters 112 will clog and need to be washed more quickly or more often. It has been found that by leaving some larger solid particles in the cooking oil to engage filters 112, the required frequency for cleaning of the filters 112 will be less, as the larger solid particles form what is in effect an outer large particle screen directly against the outer surface of filters 112 which has the effect of collecting many of the smaller solid particles on the collecting barrier of large solid particles, and this reduces the amount of very fine solid particles reaching the small pores of filters 112 which can clog the pores, and from vantage point this is filtering in series. It has been found that a metal screen with openings of about 3/64 of an inch for the crumb basket screen 42 will function well to filter out very large chunks which might clog conduits 150 and 152 and the pump 148, while leaving in solid particle chunks in the oil which will pass through the 3/64 opening to collect against the outer surface of sintered filters 112 to reduce or slow the very small solid particles from clogging the small pores of the filters 112. 1/8 inch openings in screen 42 would be toward the too large size and could allow crumbs to possibly clog conduits 150, 152, and the removal of solid particle smaller than about 100 microns in dimension with crumb basket 42 would lead to requiring sintered filters 112 to be cleaned more often, and also may not allow the impurity laden cooking oil to flow through the screen 42 quickly enough. Crumb basket screen 42 is supported by attached flanges 44, attached to the upper edges of the open top box like pre-screen 42, the flanges 44 rest on the top surface of panel 28 of reservoir 22 to support crumb basket 42 in opening 40. Basket 42 is removably retained to allow it to be manually lifted from opening 40 for dumping of collected crumbs. Positioned over opening 40 and crumb basket 42 is a door 46 which covers crumb basket screen 42 and opening 40 when embodiment 20 is not in use; mainly for sanitary purposes. The door 46 should be attached or otherwise arranged so as to remain open when raised, and to this end it can be attached to tilt back a little when opened, or a latch could be used. Hinge 48 attaches door 46 to top panel 28. It should be noted it would be within the scope of the present invention to make conduit 150 connected to the input side of pump 148 at least in part flexible and sufficiently long to be inserted directly into the fryer vat 170 whereby the oil would be drawn directly from vat 170 through conduit 150, moved into conduit 152 and canister 96, filter 112 and then redeposited into the fryer vat 170, although this is less preferred for reasons which should be clear, this direct suction from the vat 170 could be employed particularly if the fryer vat 170 was not equip with a drain pipe 172. This arrangement might eliminate reservoir 22, and if so would not allow the complete draining of the fryer vat 170 unless canisters 96 were very large, and would probably require circulating the oil for a significantly longer period of time since initially filtered oil would be deposited back into the vat which still contained unfiltered oil.

Figure 2:
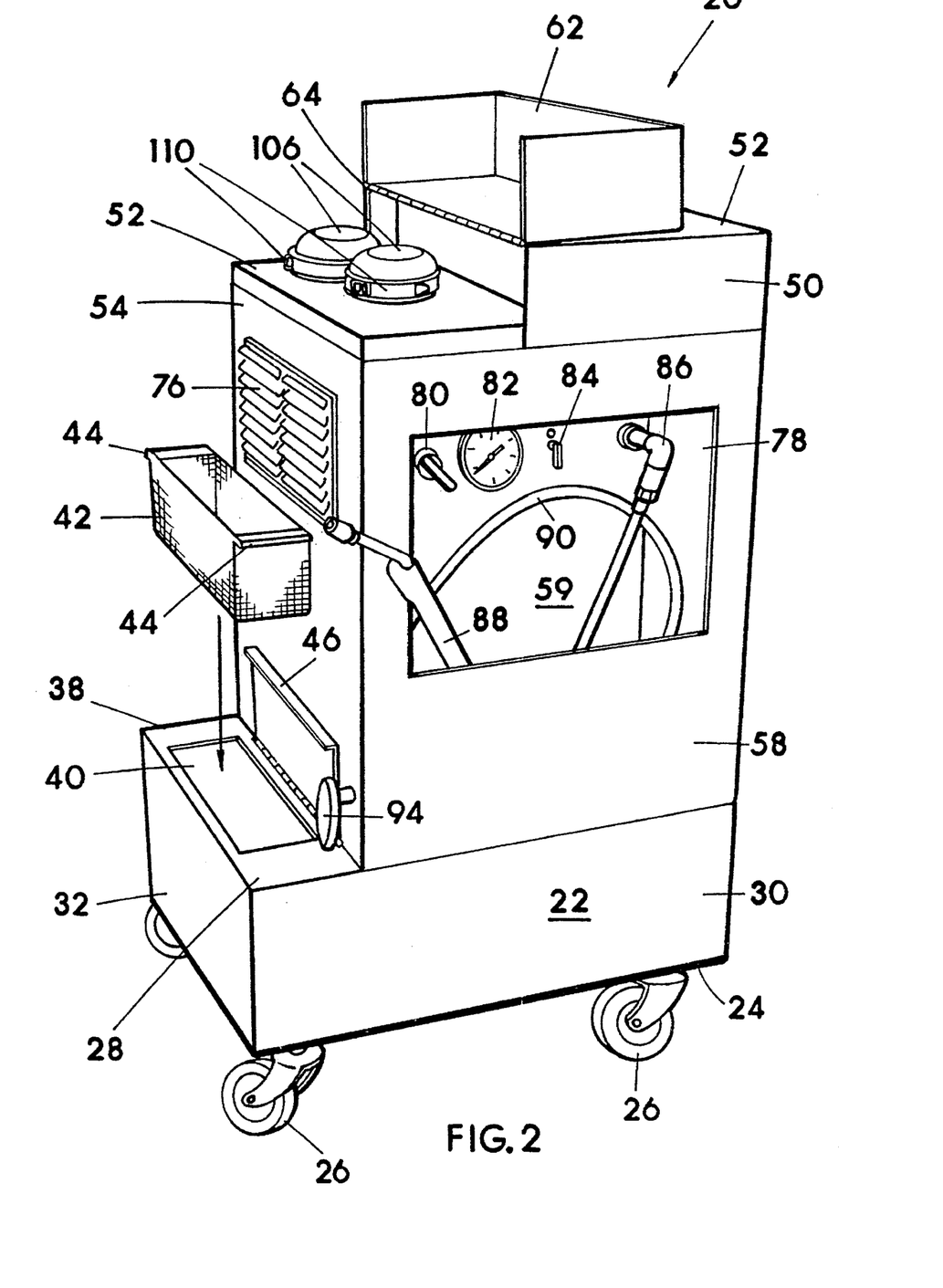
FIG. 2 is a front left side perspective view of a preferred embodiment in a portable filtering apparatus in accordance with the present invention.
Figure 3:
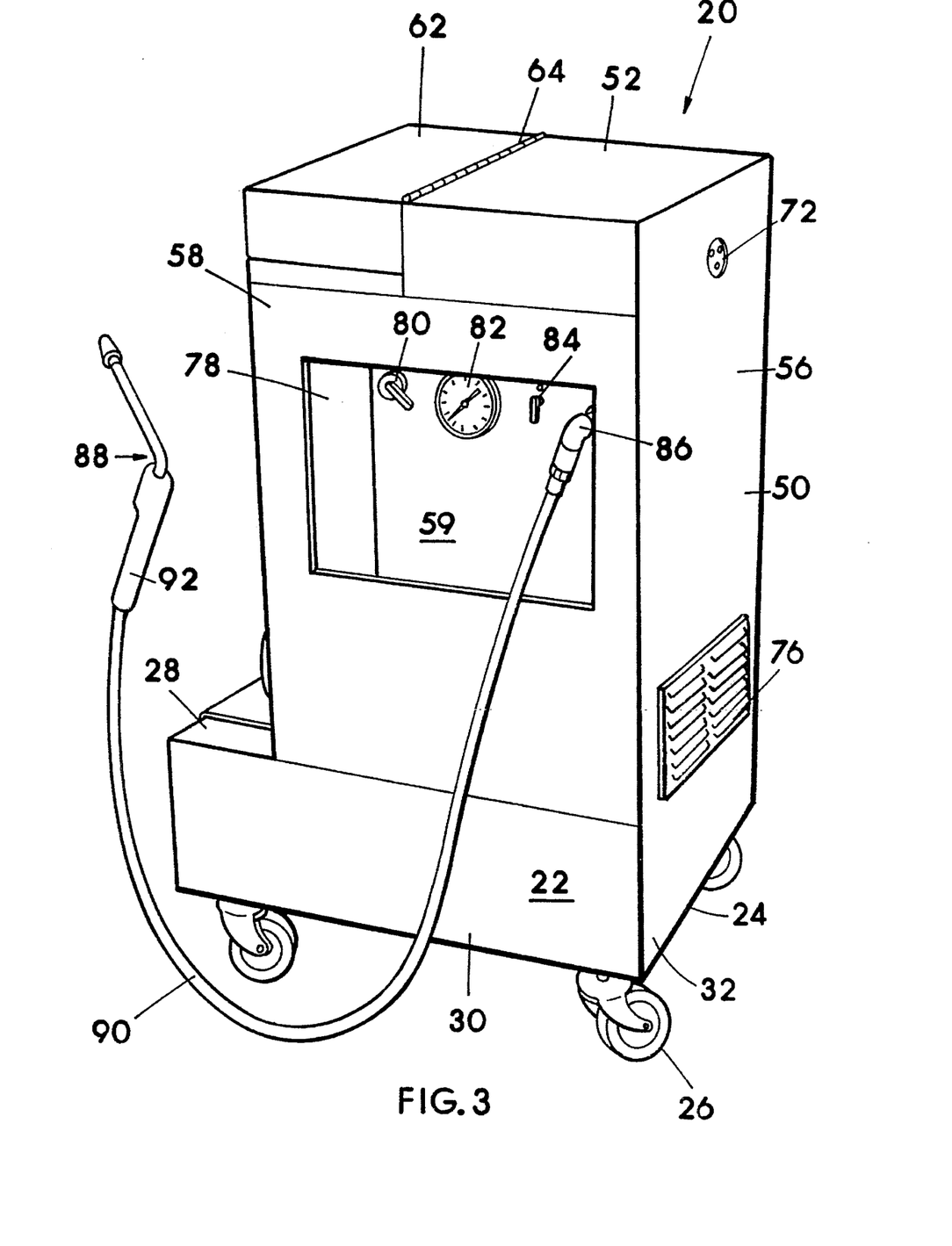
FIG. 3 is a back left side perspective view of the embodiment of FIG. 2.
Figure 4:
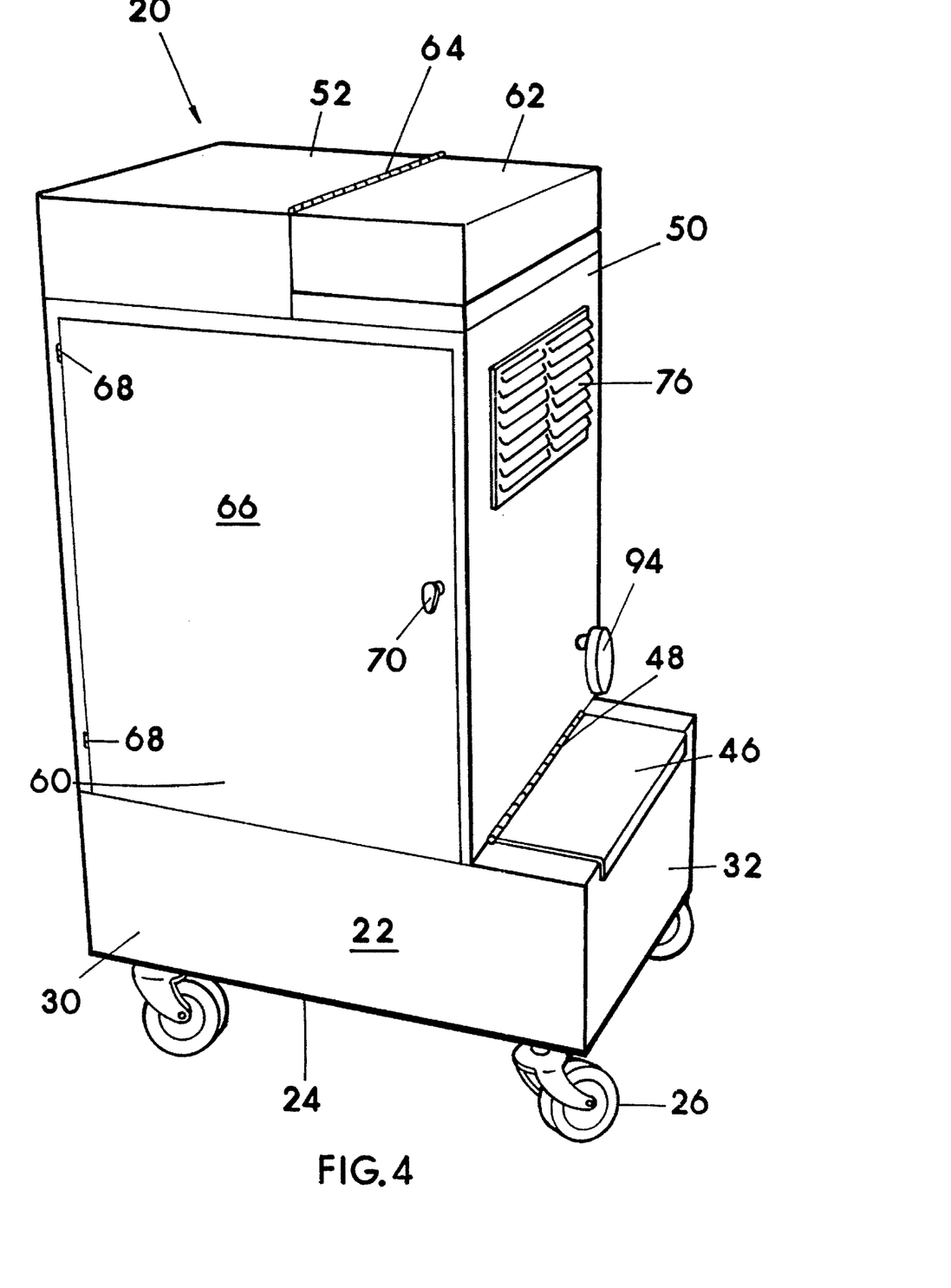
FIG. 4 is a front right side perspective view of the embodiment of FIG. 2.
Figure 5:
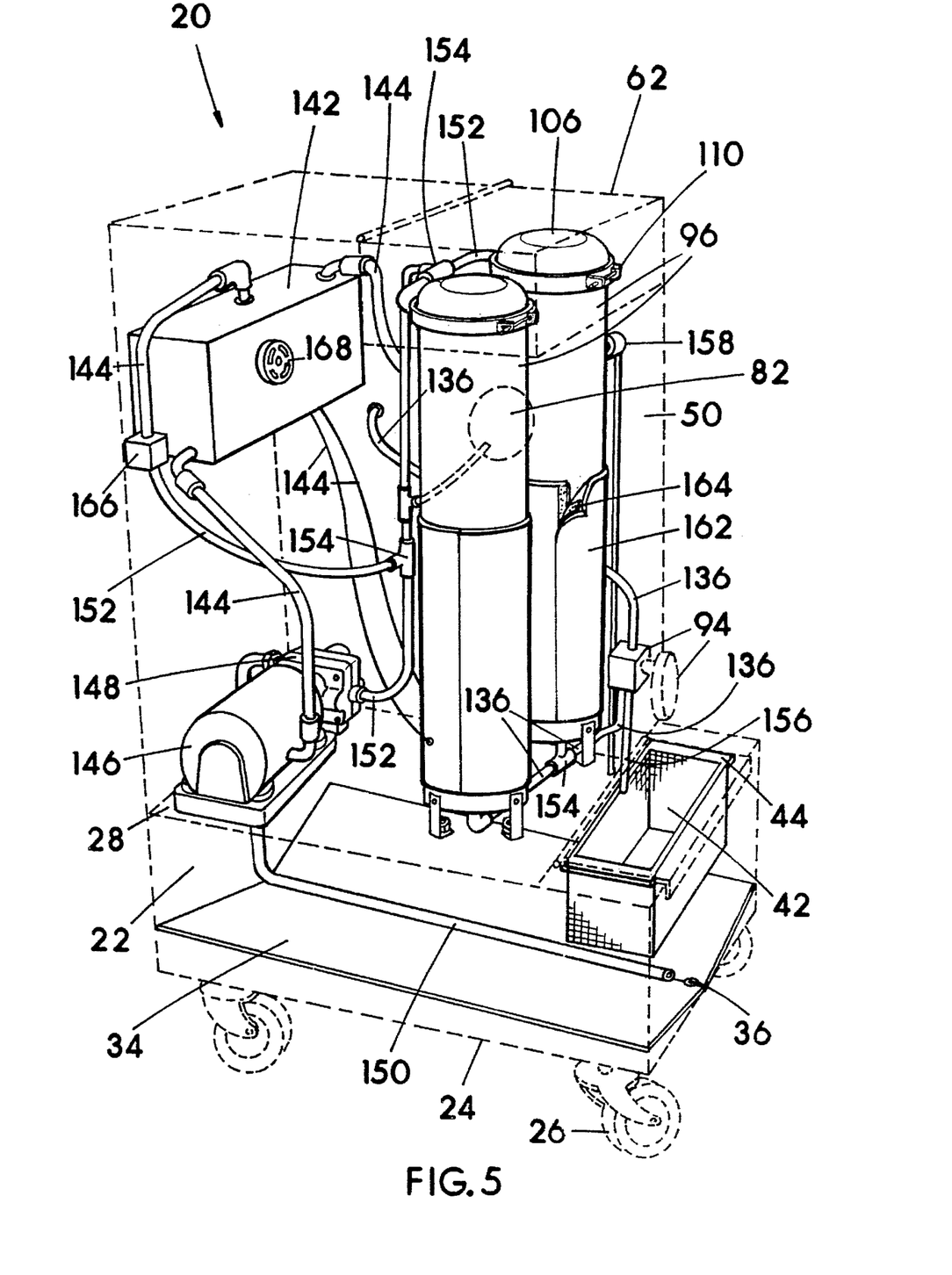
FIG. 5 is a front right side perspective view of the embodiment of FIG. 2 with a main housing and lower auxiliary reservoir shown in broken lines to show internal components.
Figure 8:
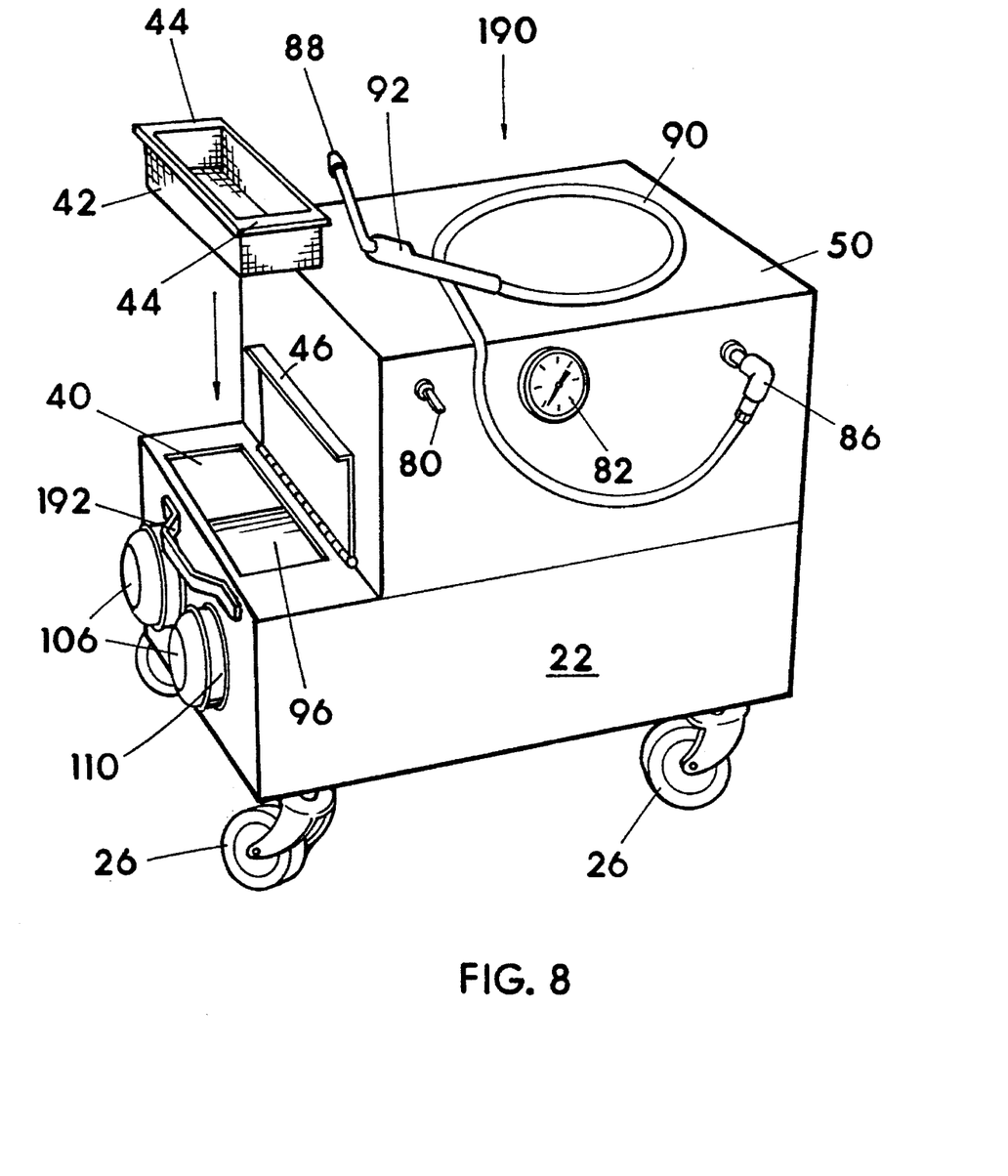
FIG. 8 shows a front left perspective view of another preferred embodiment in accordance with the invention.
Figure 9:
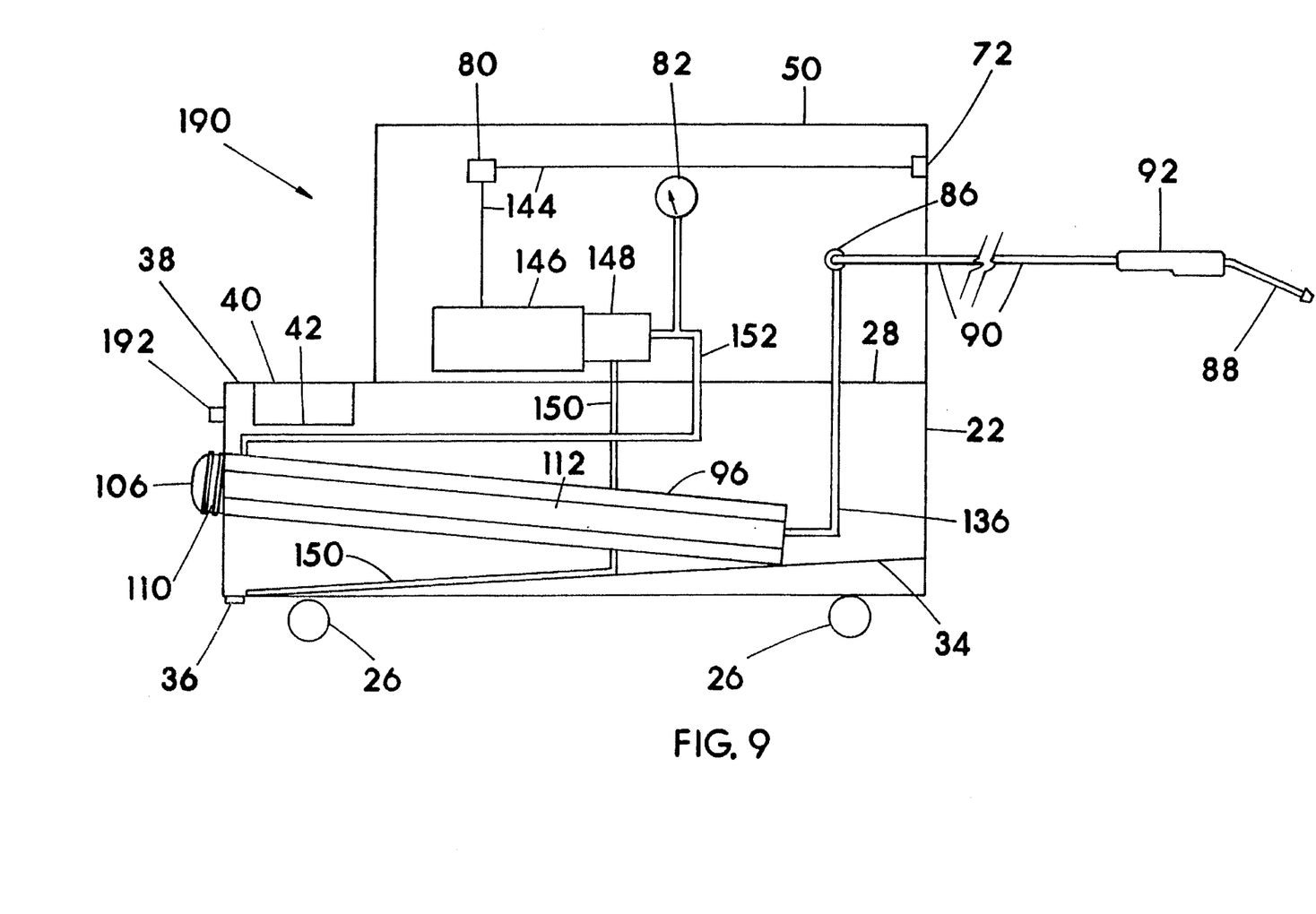
FIG. 9 is a schematic depiction of the embodiment of FIG. 8.

Shown in FIG. 2–7 is housing 50 generally comprised of flat rectangular panels including housing front 54, housing back 56, left side 58 and right side 60 each connected to panels 54 and 56, and housing top 52, all of which sit affixed atop reservoir 22. Housing front 54 is basically comprised of a flat rectangular panel, containing air circulation cooling vent 76 and fluid diverter valve and handle 94. Front panel 54 is positioned slightly rearward of opening 40 and door 46 of reservoir 22. Housing back 56 supports electrical socket 72 (male), which receives the female cord end of a power cord 74 which provides standard 120 volts 60 cycle AC power, in the U.S. Other voltages are applicable for other countries or in more industrial setting in the U.S. such as 240, 208 and 480 volts for example. Power cord 74 provides the power to operate all electrical components within embodiment 20. Housing back 56 also contains a cooling vent 76 for releasing hot air from the housing 50 to help keep motor 146 cool. Right side 60 of housing 50 includes access panel 66, connected by hinges 68 and openable with latch handle 70, which allows access and thus servicing of the various operating parts contained within housing 50, such as motor 146. Left side 58 comprises a flat panel having a cut-out or recess 78 into which panel 59 is located, and inwardly slightly to define the recess. The recessed panel 59 is affixed with gauge 82, on/off switch 80, timer and control knob 84 for pre-heaters 162, and the filtered oil exit fitting 86 connecting to flexible dispensing hose 90 (see FIG. 2). Flexible dispensing hose 90 is connected to housing 50 by ninety-degree pipe fitting 86 for close fit storage of the coiled hose 90. Hose 90 is endwardly affixed with wand 88 including a thermally protective of handle 92. Recess 78 provides mechanical protection for the various components by recessing them inward to protect them from physical impact, and also provides a storage area for dispensing hose 90 when coiled as shown in FIG. 2. Housing top 52 is generally divided into two stepped flat horizontal elevations with the front lower elevation having a safety lid 62 which, when closed, is level with higher other elevation. Safety lid 62 is connected to the lower front section of housing top 52 by hinge 64, and when closed covers filter canister lids 106. The top or upper ends of the canisters 96 in this example extend slightly above and through tight fitting openings in top panel 52, the tight fitting opening in which the upper ends of the canisters 96 reside support and stabilize the upper portions of the canisters 96. Lids 106 are a component of a sealing system to prevent leakage of oil 178 from the top end of canisters 96 and to allow removal of filters 112, and safety lid 62 helps protect the operator from being squirted with hot oil 178 should the sealing system about lids 106 fail. As can be seen in FIG. 5, housing 50 encloses electric motor 146 which is connected to and drives fluid pump 148. Housing 50 also encloses, wiring 144, numerous fluid conduits 150, 152, 136, etc; and supports components such as a pressure gauge 82 exposed to the outside of the embodiment 20, and switch 80 used as electrical controls (see FIG. 3). On/off switch 80, a manually controlled main electrical switch, operates pump motor 146, which may be a more sophisticated switch which could also control pre-heaters 162. Variations in electrical controls are anticipated. Oil pressure gauge 82 displays oil pressure or pressure indications on the output side of pump 148 to indicate whether filter(s) 112 need cleaning. Gauge 82 indicates excessive back pressure or flow resistance through sintered filter(s) 112, visually indicating the need to clean the filters. Gauge 82 is connected in fluid communication with the oil in conduit 152 (second conduit means) and the input side of the filters 112 to sense the pressure against the input side of the filters 112. Timer and control knob 84 is a manually controlled electrical switch for heater blankets 162, and may be a manually operated spring-wound electrical switch used to start, and then stop heat blankets 162, preventing them from continuously pre-heating filter canisters 96 and filters 112. Electric heat blankets or equivalents thereto are used to pre-heat and liquify any solidified fat in canisters 96 and against filters 112 prior to fully operating embodiment 20. Heaters 162 may be thermostatically controlled instead of timed. Lock-out electrical relays or thermostats may be used to prevent motor 146 from operating prior to canisters 96 and filters 112 being up to temperature. In FIG. 5 hook and loop fastener strips 164 are shown used to maintain the heat blankets 162 tightly wrapped about the exterior of the canisters 96. The filter canisters 96 and filters 112 can be positioned horizontally within reservoir 22 so that hot oil received from deep fat fryer 170 will surround the canisters 96 and quickly bring to such a temperature as to liquify any solidified oil in canisters 96 and against filters 112, as will be described in reference to embodiment 190. This horizontal canister 96 arrangement will eliminate the need for any heat blankets, heater or controls therefore, and would represent or render an apparatus (see FIGS. 8 and 9) appearing substantially different than embodiment 20, but would still be within the scope of the invention. The reason for pre-heating of the canisters 96 and filters 112 is simply that if oil left against filter 112 from a previous filtering operation is congealed or solidified based on having cooled-off and being of a type of oil (fat) which is solid at room temperature, when oil is pushed against the filter 112 in an attempt to filter the oil at the beginning of new filtering phase, the congealed oil will block passage of the oil through the filter, and very high fluid pressure can develop. When using a sintered filter which has a porosity sufficiently fine to remove solid particles from oil which are quite small, such as 5 microns, it requires a relatively high pressure such as around 10 psi to push the oil through a clean filter under the best of conditions, and depending upon the abilities of the motor and pump 146, 148 to develop pressure, it is possible to crush even a sintered stainless steel filter 112 if the filter is plugged with congealed oil. The pressure applied to a sintered metal filter which has accumulated a significant amount of solid particles from filtering can normally reach 75 to 100 psi during filtering to remove solid particles to 5 microns, and higher pressure are associated when filtering down to 0.5 microns, and thus motor and pump 146, 148 must be capable of delivering such high pressures. Thus pre-heating is to liquify any congealed oil on the filters 112. Problems can also arise in conduits which have entrapped congealed oil, which is why the oil carrying conduits such as 150, 152, 136 and 90 for example should be arranged to drain-down or to be able to be drained down at the end of a filtering phase, or should have pre-heaters applied to the conduits. Diverter valve 94 in embodiment 20 is primarily for draining down lines after a filtering operation. Fluid diverter valve and handle 94, a manually operable valve which includes a handle exposed on front of embodiment 20 is for selecting between sending filtered oil back to reservoir 22 or out flexible dispensing hose 90 to deep fat fryer 170. The diverter valve 94 should be positioned low in elevation as it is primarily for draining with gravity flow any small quantities of oil remaining in canisters 96 or hose 90 after filtering back into reservoir 22. Regardless of the position of the handle of valve 94, air is allowed to be purged by incoming oil from canisters 96 and filters 112, wherein the air is either directed out hose 90 or into reservoir 22.

Figure 6:
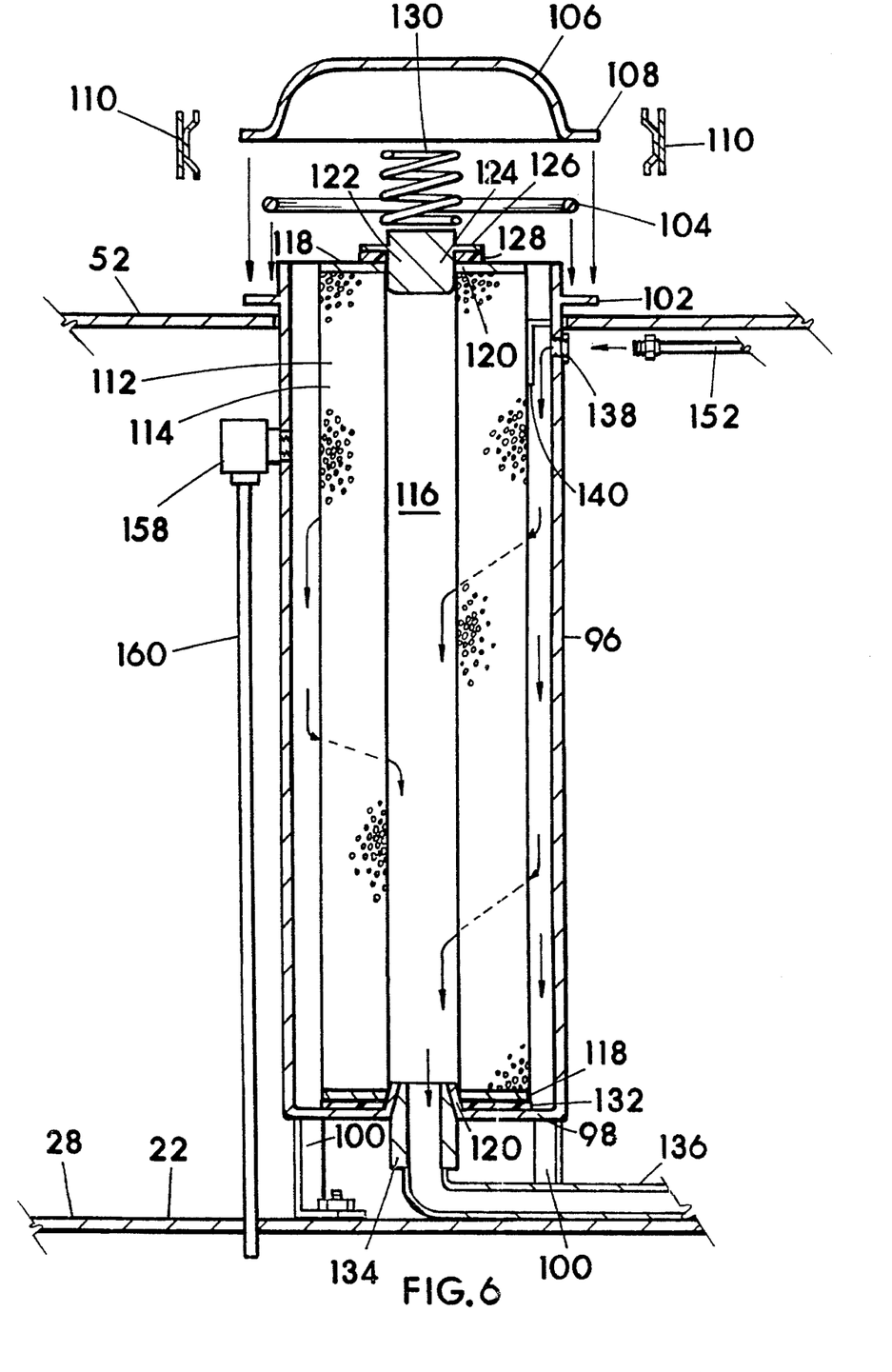
FIG. 6 shows a filter canister and sintered filter in cross section along with other associated components.
Figure 7:
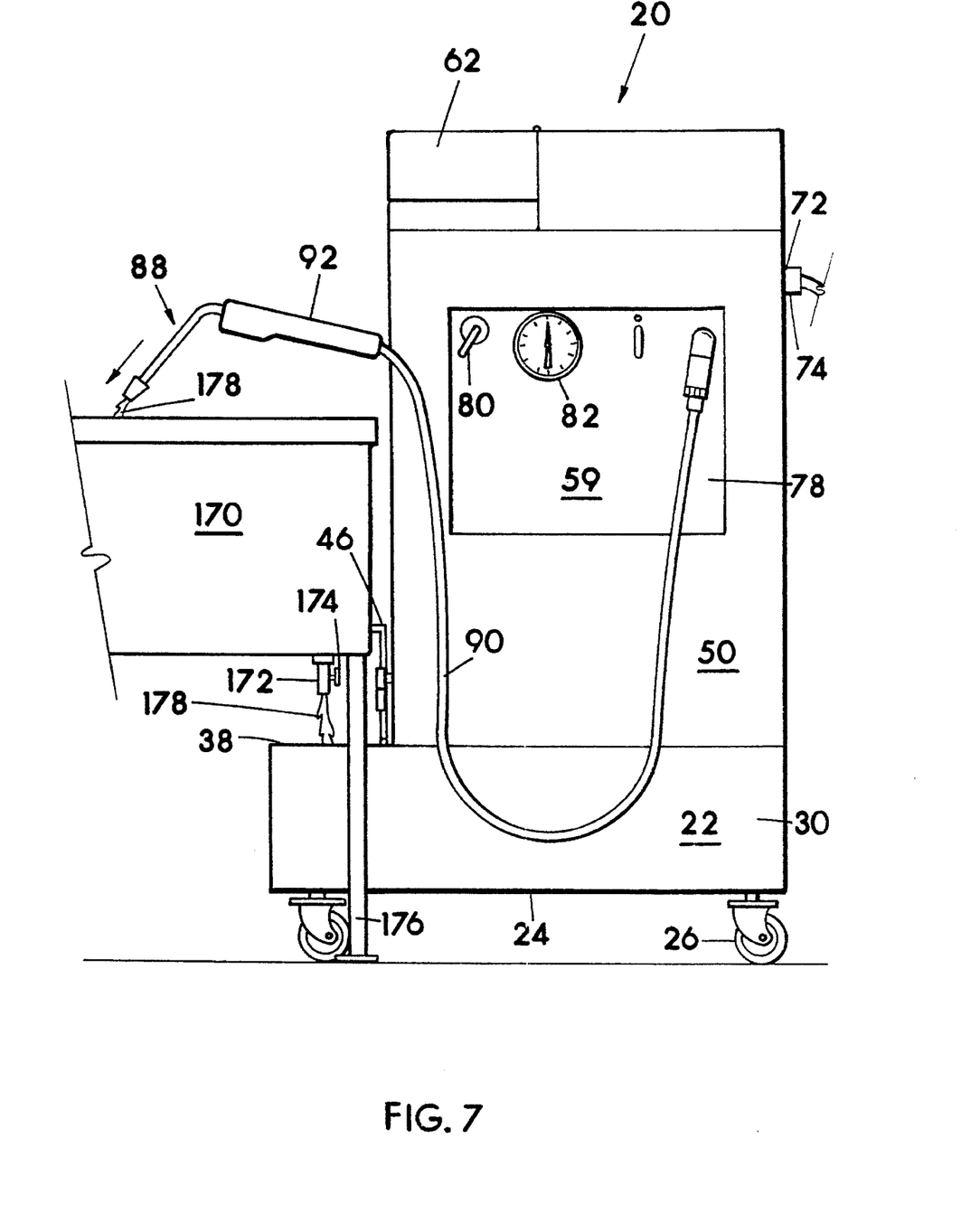
FIG. 7 shows the embodiment of FIG. 2 from the left side adjacent a deep fat fryer vat.

FIG. 5 shows two filter canisters 96, each comprising a fluid tight annual wall defining a tube for removably containing a sintered stainless steel filter 112, one filter 112 per canister 96. Each canister 96 is sealed fluid tight in operation except for an impurity laden oil inlet pipe 152 and a filtered oil outlet pipe 136 (see FIG. 6). Canister bottom panel 98 closes the canister 96 bottom or lower end except for filtered oil outlet pipe 136 through fitting 134, and bottom hole 120 of the filter 112. The canister support legs 100 attach each canister 96 to top of reservoir 22 to support the weight and stabilize the bottom ends of the canisters. Each canister 96 is arranged to allow removal of filter 112 for cleaning through the top end of each canister, the top end of the canisters 96 being just above top panel 52 of housing 50. The lids 106 when in the closed position are sealed liquid tight to the canisters 96. When the lids 106 are moved or removed from their sealed position, the filters 112 can be reached by hand and pulled of the canister. Top flange 102 is an annular flange attached to the top exterior of each of the canisters 96 above panel 52, and is part of the canister top end fluid seal and openable lid structure. O-ring seal 104 rests on top of flange 102 to provide part of fluid seal system. The lid 106 on each canister 96 includes a flange 108 which rests on o-ring 104; lid 106 is removable to allow removal of sintered filter 112 from canister 96. The lids 106 may be attached to apparatus by hinges, and may be shaped differently than shown. Outer flange 108 mentioned above, compresses o-ring 104 against canister top flange 102 for fluid sealing. Tightenable U-shaped annular bands 110, one per lid 106 are removably installable and have sloped interior flange engaging surfaces (see FIG. 6) to compress the lids 106 and seals onto canister 96 to make the top end of the canisters 96 fluid tight. The bands 110 each include a cam-actuated tightening lever which in a first position reduces the diameter of the band, and when in a second and outward position greatly increases the diameter of the band 110 to allow the band to be removed from flanges 102 and 108 to allow removal of lid 106 and sintered filter 112. Other compressing and latching device other than bands 110 can of course be utilized. In FIG. 6, filter 112 is shown as an elongated and tubular (cylindrical) cartridge-like element. The filters 112 are preferably made of sintered stainless steel granules, and may be cleaned and reused repeatedly. The filter 112 is made in a sintering operation using beads or granular stainless steel. Suitable such sintered metal filters 112 are available from various manufacturing companies in the U.S. including Osmonics, Inc. of Minnetonka, Minn. U.S.A., and from Purolator of Greensboro, N.C. U.S.A. Sintered metal filters can be purchased in flat sheet form, convoluted sheet form or in cylindrical tubular cartridge form having either flat or convoluted surfaces, and the use of any of these shapes in within the scope of the invention. Sintered metal filters are available in a variety micron rating designs. Additionally such filters are available with reinforcing wire screen or wire cloth diffusion bonded on one or both sides of the sintered metal filter material to add even greater strength rigidity to the filter.

In FIG. 5, two canisters 96 and two sintered filters 112 are shown used and connected in parallel in order to expose a greater exterior filtering surface area which provides for extended operation of oil cleaning prior to having to remove the sintered filters 112 and clean them in a sink or dishwasher with hot water and soap or solvents.

The annular wall 114 of filter 112 substantially defines porous filtering media through which oil passes and deposits solid impurities onto filter 112, and then leaves filter 112 substantially clean. The open center 116 of filter 112 is a hollow defined by annular wall 114. Oil passes from the exterior of filter 112 to the interior hollow 116 and then exits filter 112 and canister 96 through a hole fitted with fitting 134 in bottom panel 98 center underneath an outlet hole 120 in filter 112, the fitting 134 connects to conduit 136 at the bottom of canister 96. Conduit 136 effectively applies filtered oiled to the back side of the ninety degree fitting 86, although in this example the conduit 134 first engages diverter valve 94. It should be noted the unfiltered oil could be introduced into the hollow center of the filter 112 and the filtered oil collected and directed on and from the exterior surface of the filter 112 within the scope of the invention. Suction or vacuum could be used to forcefully move the oil through the filter and opposed to pressure, which is well within the scope of the invention. Shown in FIG. 6 are end plates 118 on filter 112; one on each oppositely disposed end of the filter 112. There is a hole 120 in filter bottom end plate 118. A hole 120 is not required at the top end of the sintered filter 112 in the shown particular arrangement, but the filters 112 are normally manufactured with such configuration for use in other industries (pharmaceuticals); or in other words, the top end plate 118 adjacent lid 106 need not have a hole 120. The bottom end plate 118 has a hole 120 to allow clean oil to leave the interior hollow 116 of the filter 112. Shown in FIG. 6 is a filter top end plug 122 which seals non-required hole 120 in filter top end plate 118 for the application of the filter 112 in the present embodiment 20. A solid circular plug 124 is the plug body of 122 which fits into hole 120. 126 is an annular flange on plug body 124 defining part of the fluid seal. A plug flange o-ring 128 rests between flange 126 and the top end plate 118 to seal. Spring 130 is a compression spring which pushes on plug body 122 to tightly engage o-ring 128. Spring 130 pushes against and between the underside of lid 106 and plug 124. The hole 120 in the top plate 118 could be welded or otherwise permanently closed for the filtering arrangement shown in FIG. 6. Shown in FIG. 6 is a filter/canister bottom annular rubbery o-ring seal 132 which seals around filter end plate 118 opening 120; encircles fitting 134 and prevents passage of fluid from the exterior side of filter 112 to interior hollow 116 at the bottom end of the filter 112. Fitting 134 is a fitting through which fluid (clean oil) leaves the hollow interior 116 of filter 112 to enter clean oil carrying conduit 136 at the bottom of the filter canister 96. Fitting 134 is shown as a upwardly tapered fitting in the center of o-ring 132 and having conduit 136 attached thereto in FIG. 6. Filtered oil output piping 136 is a general designation of any piping or hosing (fluid conduit) carrying clean oil on the output side of a filter canister 96 before (upstream of) hose 90 and wand 88. Input opening 138 (see FIG. 6) into canister 96 is the opening in the wall of the canister 96, to which unfiltered oil input conduit 152 is connected to feed impurity laden oil into the canister 96 to engage the exterior of the sintered stainless steel filter 112. Input opening fluid dispersal flange 140 is a short plate or flange inside and attached to the canister 96; positioned over the unfiltered oil entrance, but in spaced relationship to force the entering oil sideways so as to not flow straight against the filter 112 in a small area.

In FIG. 5, an electrical junction box 142 is shown mounted in housing 50, and is used for containing electrical splices and the like. Junction box 142 is mounted to cover the backside of electrical socket 72. 144 designates electrical conductor lines (wires) in protective conduits, or electrical conductors not in protective conduits such as the zip cords extending from the heat blankets 162 into the junction box 142. The shown tee fittings 154 in FIG. 5 are fluid conduit tees used for dividing a single fluid carrying conduit into two, such as 152 being divided to input oil into the two canisters 96 or the merging of two fluid carrying conduits into one, such as conduits 136 carrying filtered oil from canister 96 being merging so ultimately both lines 136 feed filtered oil into diverter valve 94, and then as a single conduit to dispensing hose 90. In FIG. 5 a conduit 156 is shown extending from diverter valve 94 downward into reservoir 22 to return oil back to reservoir 22 dependant upon the setting of valve 94. In FIGS. 5 and 6 a pressure relief valve 158 is shown, the valve 158 opens upon excess pressure in a canister 96 to divert oil back into reservoir 22 through relief valve pipe 160, and is primarily for safety purposes, and can also prevent crushing of a clogged filter 112. Valve 158 is normally closed. Also shown in FIG. 5 is a fluid pressure operated electrical switch 166 for a excessively high fluid pressure alarm, which is optional, to noise generator 168 if too much fluid pressure is sensed in canisters 96 or conduit 152 which would indicate the need to clean one or both sintered filters 112. Pressure switch 166 could be used to deactivate motor 146 if fluid pressure within the system became too great for whatever reason.

The basic operation of embodiment 20 should be clear at this point, however for the sake of positive clarity, the oil which is preferably hot is drained from fryer vat 170, motor 146 is activated and pump 148 draws oil from reservoir tank 22 through conduit 150 (first conduit means) and pumps it into conduit 152 (second conduit means) then into the canisters 96 under pressure, the oil moves through the sintered filters 112 leaving the solid impurities on the exterior surface of the filters 112, and the filtered oil moves into filtered oil carrying fluid conduits 136 and then flexible dispensing hose 90 (third conduit means) and out the wand 88 back into the deep fat fryer vat 170. Depending upon position of valve 94, the filtered oil can be re-deposited back into the reservoir With reference now primarily to the drawing FIGS. 8–9 of embodiment 190. Like parts in embodiment 20 and 190 have like reference numbers applied in the drawings. Embodiment 190 is very similar to embodiment 20 in many ways, including the use of sintered metal filters 112 removable from canisters 96. Embodiment 190 is structured with the filter canisters 96 and filters 112 positioned generally horizontally within reservoir 22 so that hot oil received from deep fat fryer 170 will surround the canisters 96 and be adjacent and in close proximity to the filters 112, and quickly bring the canisters and filters 112 to such a temperature as to liquify any solidified oil against filters 112. This horizontal or submerged canister 96 arrangement will eliminate the need for any pre-heat blankets, heater or controls therefore, but what is obtained in this embodiment is the use of the hot cooking oil received from the fryer 170 as the pre-heat means for the filters 112. As can be seen from FIG. 8, embodiment 190 has a great many commonalities with embodiment 20, but may be significantly shorter in vertical height. Embodiment 190 is generally arranged so that after filtering and the shutting off of pump 148, oil in conduits 150, 152, 136 will drain down with gravity into lower positions within reservoir 22 wherein if the oil congeals, hot oil drained from a fryer 170 will surround the conduits having congealed oil and quickly heat and liquify the oil. Hose 90 can and should be manually raised at the end of a filtering cycle to drain fluid from the hose into the vat 170 and then into the lower portions of conduit 136. Diverter valve 94 is not shown employed on embodiment 190. Both embodiment 20 and 190 can of course utilize a single canister 96 and single filter 112, although two canisters 96 each with a sintered metal filter 112 are used in embodiment 190. Embodiment 190 includes a handle 192 mounted on what is consider the front vertical surface above the removable exposed lids 106 which allows the tilting of the apparatus upward to rest on its back side for more convenient filter 112 removal. Although not shown, embodiment 190 should have an access panel to allow servicing of parts within housing 50, and should have a vent in housing 50 to release heat to help keep the components therein such as motor 146 relatively cool.

It should be noted that in embodiment 20 wherein the canisters 96 are shown mounted on top of reservoir 22, it would be possible to lower the bottom ends of the canisters 112 into reservoir 22 so that at least the lower portions of the canisters 96 and the contained filters 112 would be submerged in hot oil drained into reservoir 22 which might supply enough pre-heating to eliminate the heat blankets 162 with the vertical canisters. It should also be understood that not all oil used as cooking oils congeal or become solid at room temperature, and thus if such cooking was to be exclusively of the type filtered with apparatus 20 or 190, pre-heating as described above would not be necessary.

Additionally, motorized pump 146, 148 is required to forcefully move cooking oil through a fine sintered metal filter, particularly if one wishes to rapidly filter cooking oil. When using a sinter metal filter having a porosity for filtering out solid particles down to 5 microns, generally speaking, cooking oil will not flow through the filter without the aid of pressure or vacuum, and thus gravity flow of the oil through such filters seem unfeasible at this time.

Although the invention has been very specifically described by way of several examples sufficient for those skilled in the art to both make and use the invention without resorting to undue experimentation, the description of the invention is not intended to limit the true scope of the invention as defined by the included claims, as clearly many changes can be made to that herein specifically described and shown without departing from the spirit of the invention.

What is claimed is:

1. An improved process for on-site filtering of cooking oil of a deep fat fryer vat;

wherein the improvements comprise;

moving cooking oil from the fryer vat and utilizing a motorized fluid pump to forcefully move the cooking oil of the fryer vat through a renewable filter element comprised substantially of fused metal granules defining said filter element with a porosity sufficiently small as to filter solid particles at least down to 50 microns in dimension out of the cooking oil as the cooking oil moves through said filter element, and filtering solid particles at least down to 50 microns in dimension from the cooking oil by the forceful movement of the cooking oil through said filter element prior to returning filtered cooking oil to the fryer vat utilizing said motorized fluid pump to return the filtered cooking oil to said fryer vat, and cleaning said filter element after a significant amount of solid particles have accumulated against said filter element in preparation of future filtering of cooking oil.

2. An improved process for on-site filtering of cooking oil in accordance with claim 1 further including filtering the cooking oil of the fryer vat while the cooking oil is hot, being at least 300 degrees fahrenheit, and pre-screening large chunks and particles from the hot cooking oil down to generally not less than 100 microns in dimension prior to forcefully moving the hot cooking oil through said filter element, and utilizing said filter element comprised substantially of fused stainless steel granules.

3. A process for on-site filtering of cooking oil of a deep fat fryer vat, comprising draining oil from the fryer vat through an open drain of the fryer vat into an auxiliary reservoir sized to hold all of the oil of the fryer vat;

utilizing a motorized fluid pump to force the oil from within the auxiliary reservoir through a filter element comprised substantially of sintered metal granules chemically inert relative to the cooking oil and defining said filter element with a porosity sufficiently small as to filter solid particles out of the cooking oil down to at least 50 microns in dimension;

directing the filtered oil from an output side of said filter element back into the fryer vat through a hand-held flexible dispensing hose, and manually directing the filtered oil dispensed from the dispensing hose to sides and bottom of the fryer vat for utilizing the filtered oil as a rinse while the fryer vat drain is open;

closing said drain of the fryer vat and refilling the fryer vat with oil moved from the auxiliary reservoir by said fluid pump through said filter element and said dispensing hose.

4. An apparatus for on-site filtering of cooking oil of a deep fat fryer vat, said apparatus comprising an auxiliary reservoir tank sized to receive and hold all cooking oil of a fryer vat;

a motorized fluid pump connected to first conduit means connecting between an input side of said pump and an interior of said reservoir tank for allowing said pump to draw cooking oil within said reservoir tank and move the drawn cooking oil into second conduit means connected to an output side of said pump for directing cooking oil into a canister structured to direct cooking oil received from said second conduit means through a renewable filter element contained within said canister and comprised substantially of sintered metal granules defining said filter element with a porosity sufficiently small as to filter solid particles out of the cooking oil down to at least 50 microns in dimension;

third conduit means connected to said canister and positioned for receiving filtered cooking oil from an output side of said filter element, said third conduit means including a hand holdable flexible dispensing hose for directing filtered cooking oil into the fryer vat;

said flexible dispensing hose including a thermally protective handle means for maintaining an area on said flexible dispensing hose sufficiently cool for grasping by hand when hot cooking oil is being dispensed through said dispensing hose.

5. An apparatus for on-site filtering of cooking oil of a deep fat fryer vat according to claim 4 wherein said apparatus is mounted on wheels so that the apparatus can be rolled on a floor.

6. An apparatus for on-site filtering of cooking oil of a deep fat fryer vat according to claim 5 wherein said filter element is a cylindrically shaped filter element comprised substantially of stainless steel and removably contained within said canister; said canister including an openable lid openable to allow removal of said filter element for cleaning of said filter element and reinstallation of said filter element into said canister.

7. An apparatus for on-site filtering of cooking oil of a deep fat fryer vat according to claim 6 wherein indicating means is connected in communication with unfiltered cooking oil between said output side of said pump and said filter element for providing indications as to when said filter element is providing high resistance to cooking oil flow through said filter element.

8. An apparatus for on-site filtering of cooking oil of a deep fat fryer vat according to claim 7 wherein said indicating means is a pressure gauge mounted to be visually read.

9. An apparatus for on-site filtering of cooking oil of a deep fat fryer vat according to claim 8 wherein pre-heating means is applied to said canister for raising the temperature of said canister and said filter element for liquefying congealed cooking oil.

10. An improved on-site deep fat fryer cooking oil filtering apparatus of the type including means for receiving cooking oil from a fryer vat, filtering means through which the cooking oil is filtered, and a motorized fluid pump to move the cooking oil during filtering of the cooking oil, wherein the improvement comprises;
said filtering means including a rigid and renewable filter material comprised substantially of fused metal granules defining a porosity for filtering out solid particles from the cooking oil down to at least 50 microns in dimension.

11. An improved on-site deep fat fryer cooking oil filtering apparatus according to claim 10 wherein said fused metal granules are substantially of stainless steel having been fused to one another in a sintering operation.

12. An improved on-site deep fat fryer cooking oil filtering apparatus according to claim 11 wherein pre-screening means for removing large chunks and particles from the cooking oil down to generally not less than 100 microns in dimension is positioned for the cooking oil to pass therethrough prior to engaging said renewable filter material.

13. An improved on-site deep fat fryer cooking oil filtering apparatus according to claim 12 wherein said renewable filter material has a porosity for filtering out solid particles from the cooking oil down to approximately 0.5 microns in dimension.

14. An improved on-site deep fat fryer cooking oil filtering apparatus according to claim 12 wherein said renewable filter material has a porosity for filtering out solid particles from the cooking oil down to approximately 0.5 microns in dimension.

* * * * *